May 22, 1928.

F. H. MILKS

BRAKING DEVICE FOR ELEVATORS

Filed Sept. 3, 1927

INVENTOR
Fred H. Milks.
Ralph Burch

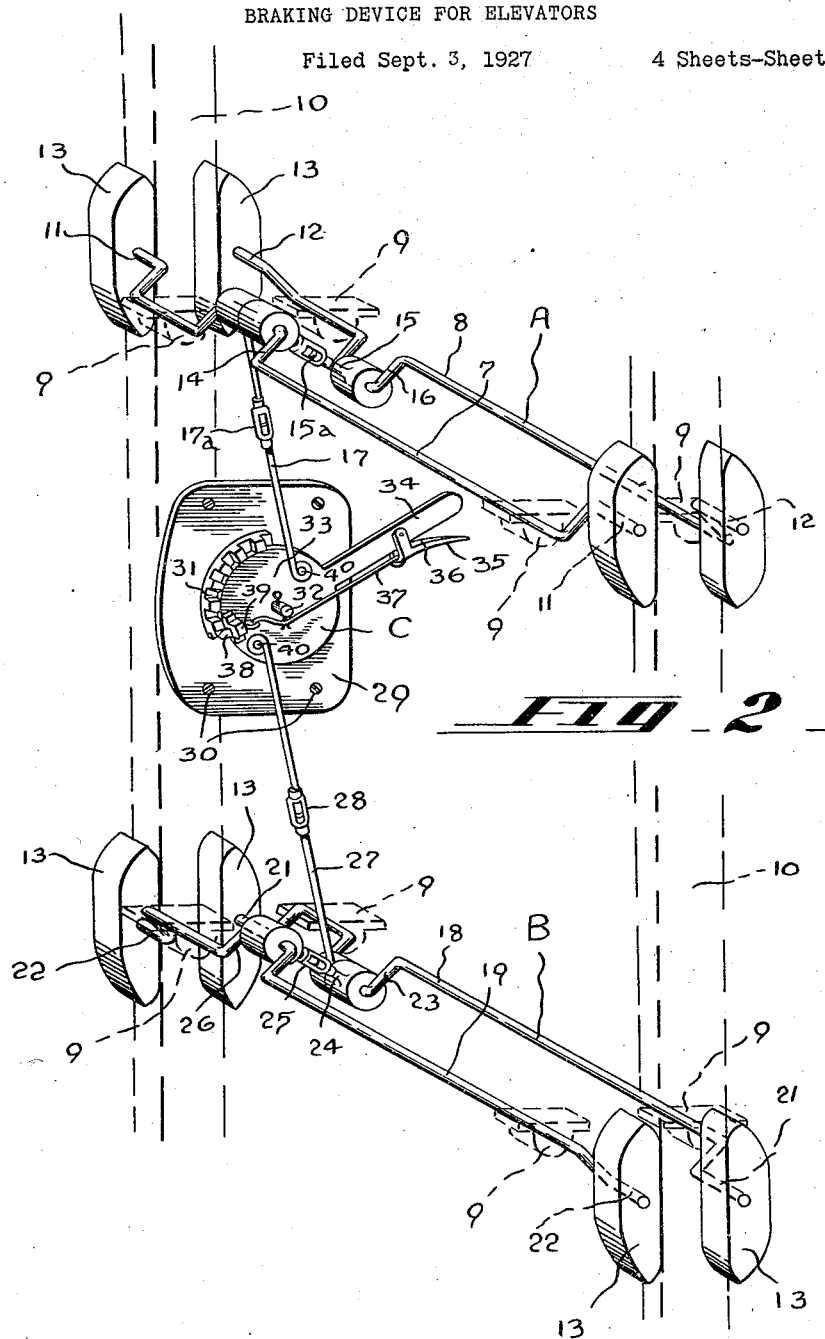

May 22, 1928.  1,670,779
F. H. MILKS
BRAKING DEVICE FOR ELEVATORS
Filed Sept. 3, 1927  4 Sheets-Sheet 3
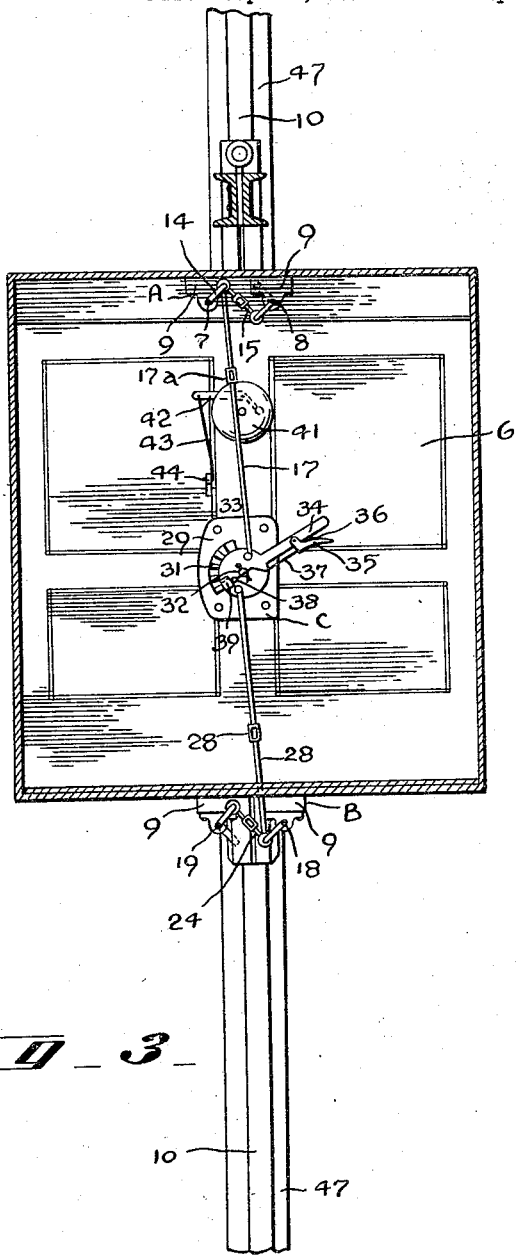
FIG_3_
INVENTOR
Fred H. Milks.
Ralph Burch May 22, 1928.
F. H. MILKS
1,670,779
BRAKING DEVICE FOR ELEVATORS
Filed Sept. 3, 1927
4 Sheets-Sheet 4
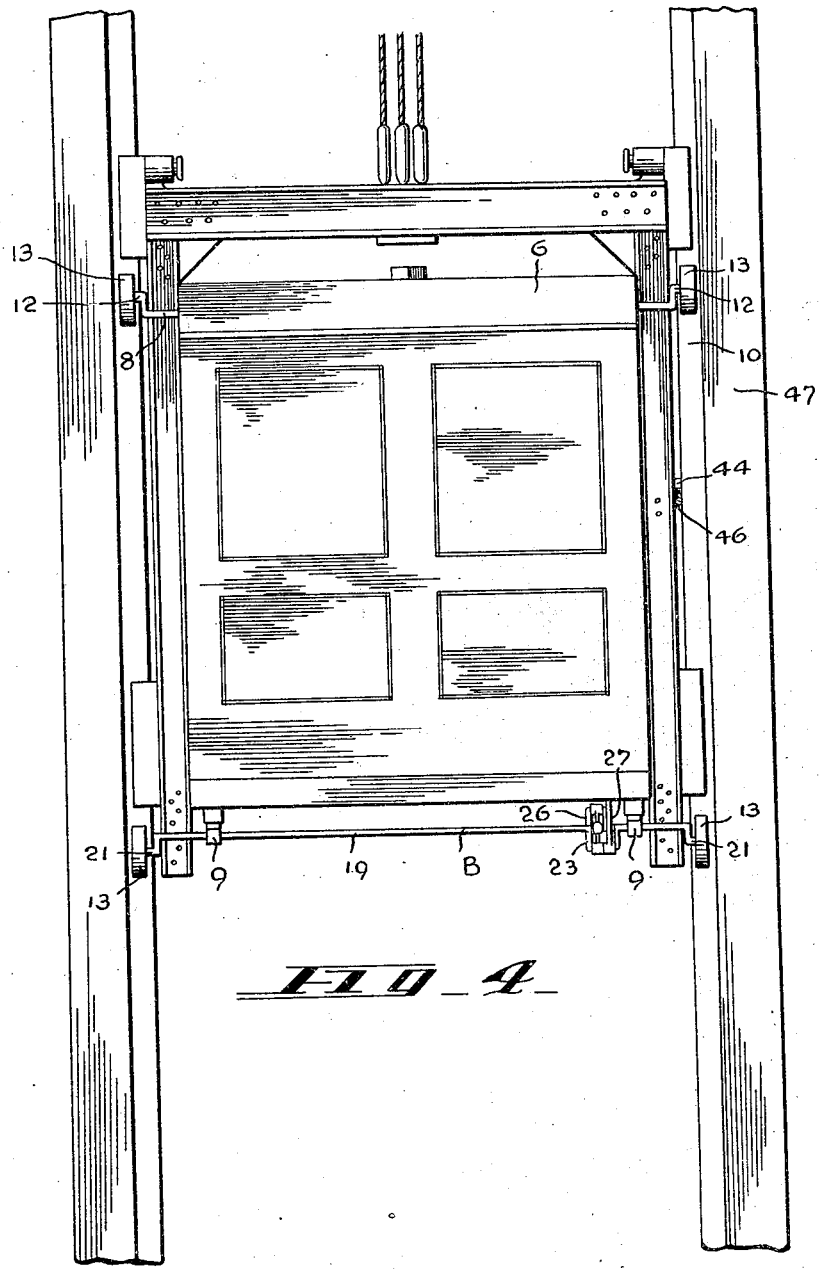
INVENTOR
Fred H. Milks.

Patented May 22, 1928.

1,670,779

UNITED STATES PATENT OFFICE.

FRED H. MILKS, OF SCHUMACHER, ONTARIO, CANADA.

BRAKING DEVICE FOR ELEVATORS.

Application filed September 3, 1927. Serial No. 217,417.

This invention relates to new and useful improvements in brakes and more particularly to a brake device for elevators or like vehicles which operate upon a track.

An object of this invention is to provide a brake device which may be attached to any type of vehicle of the character described, with a minimum amount of change or replacement.

A further object of this invention is to provide a brake device of the character described, which will serve well for emergency purposes and greatly increase the safety of the vehicle.

A still further object of this invention is to produce a brake device of the character described, which is comparatively inexpensive to manufacture, simple to operate, dependable and durable in service; positive and efficient in action and a general improvement in the art.

Other objects and many of the attendant advantages will be readily appreciated as the invention becomes better understood from a consideration of the illustrative embodiment of the same and for which purpose such descriptive drawings have been hereto appended wherein:

Figure 2 is a perspective view of the brake mechanism which constitutes this invention.

Figure 3 is a section on the plane of line 3—3, Figure 1, looking in the direction indicated.

Figure 4 is a rear elevation of an elevator embodying the invention.

Referring more in detail to the drawings in which similar reference numerals designate corresponding parts throughout the several views, It will be seen that the brake mechanism is preferably attached to the top and bottom of the elevator and is operated by a lever disposed within the cage.

Figure 1:
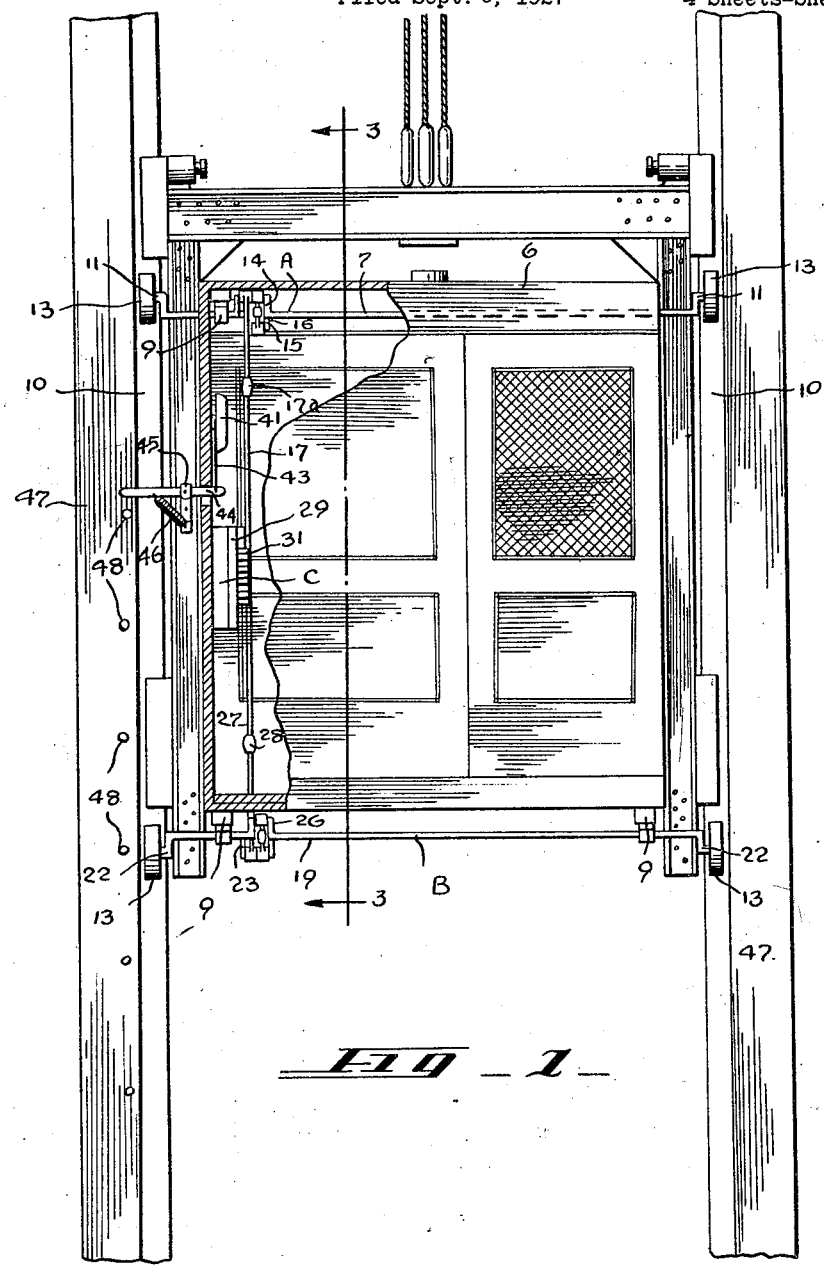
Figure 1 is a fragmentary sectioned, front elevation of an elevator embodying the invention.

The brake mechanism or unit A is conveniently connected to some upper part of the cage 6 and comprises the horizontally disposed shafts 7 and 8 rotatably mounted in suitable bearings 9. The extremities of these shafts are arranged to extend beyond the cage 6 and to lie adjacent the respective sides of the tracks 10 upon which the cage operates. The respective extremities of these shafts 7 and 8 are deflected to constitute the respective cranks 11 and 12, upon each of which is mounted a shoe 13 for engaging the tracks when the shafts are actuated.

Produced in shaft 7 intermediate the extremities thereof is a center crank 14 to which it attached a connecting rod 15 having a buckle 16 intermediate its ends for adjusting purposes. This connecting rod 15 is attached to a further adjacent crank 16 producted in shaft 8, which crank is disposed at a reverse degree to that of crank 14 so that shaft 8 will move in a reverse direction to that of shaft 7 in a manner to reverse the action of the opposed shoes 13 in relation to tracks 10. Attached to crank 14 is a further connecting rod 17 having a buckle 17$^a$ intermediate its ends for adjusting purposes. This connecting rod 17 is attached by its further end to a lever mechanism C which will hereinafter be specified.

The brake mechanism or unit B, is conveniently attached to some lower part of the cage 6 and comprises the horizontally disposed shafts 18 and 19 mounted in suitable bearings 20 with their extremities extending beyond cage 6 to lie adjacent the respective sides of the tracks 10 upon which the cage operates. The respective extremities of these shafts 18 and 19 are deflected to constitute the respective cranks 21 and 22, upon each of which is mounted a shoe 13 for engaging the tracks 10 when the shafts are actuated.

Produced in shaft 18 interjacent the extremities thereof in a centre crank 23 to which is attached a connecting rod 24 having a buckle 25 intermediate its ends for adjusting purposes. This connecting rod 25 is attached to a further adjacent crank 26 produced in shaft 19, which crank is disposed at a reverse degree to that of crank 23 so that shaft 19 will move in a reverse direction to that of shaft 18 in a manner to reverse the action of the opposed shoes 13 in relation to tracks 10. Attached to crank 23 is a further connecting rod 27 having a buckle 28 interjacent its ends for adjusting purposes. This connecting rod 27 is attached by its further end to the lever mechanism C which will be hereinafter specified.

This lever mechanism C comprises a plate 29 preferably secured to the side wall of the cage 6 by bolts 30 or the like. The plate has an arcuate rack 31 fixed thereto and also a stud 32 outstanding from the centre thereof, upon which is movably mounted a disc-plate 33 with its periphery lying adjacent the arcuate rack. Extending from the disc-plate 33 is an integral handle or lever 34 to the extremity of which is pivoted a small lever 35 tensioned by a spring 36 or the like. A rod 37 is connected by its end to lever 35 and by its further end to a pawl 38 slidably mounted in a suitable housing 39 in a manner to engage the rack 31. Eccentrically disposed studs 40 outstand from disc-plate 33, each having connected thereto one of the connecting rods 17 and 27.

It will be seen that with this arrangement, the brake units A and B are actuated by a single lever unit C which gives maximum braking with a minimum amount of performance.

As a further safety device to be used in connection with this improved brake device, a gong 41 is connected to the cage 6 and is operated by a striker 42 connected with a rod 43 to an arm 44 which is pivoted to a suitable bracket 45 and tensioned by a spring 46 or the like. This arm 44 extends from the cage 6 to be adjacent the side of the track frame 47 so as to be actuated by contact with studs 48 spaced at intervals and outstanding from the frame near the bottom of the shaft.

With this arrangement the gong will be successively struck as the cage approaches the bottom of the shaft, giving signal for the application of the brakes.

It will be obvious from the foregoing description that this invention is a great improvement in "brakes" for elevators or the like and whilst the preferred embodiments have been disclosed yet it is to be understood that minor changes in the details of construction; arrangement and combination of the co-operating elements be resorted to within the scope of what is claimed without departing from the spirit of the invention.

What I claim is:

1. A brake device for elevators comprising bearings; shafts mounted in said bearings; cranks at the extremities of said shafts; shoes mounted on said cranks; centre-cranks produced in said shafts interjacent the extremities thereof; a connecting rod connecting said centre-cranks; a lever arrangement; a further connecting rod connecting one of said centre-cranks with said lever arrangement, as and for the purpose specified.

2. A brake device for elevators comprising bearings; shafts mounted in said bearings, cranks at the extremities of said shafts, shoes mounted on said cranks; centre-cranks produced in said shafts interjacent the extremities thereof; a connecting rod connecting said centre-cranks; a turn buckle intermediate the ends of said connecting rod, for adjusting the same; as and for the purpose specified.

3. A brake device for elevators comprising bearings; shafts mounted in said bearings; cranks at the extremities of said shafts; shoes mounted on said cranks; centre-cranks produced in said shafts interjacent the extremities thereof; a connecting rod connecting said centre-cranks; a turn buckle intermediate the ends of said connecting rod, for adjusting the same; actuating means; a further connecting rod connecting one of said centre-cranks with said actuating means; and a turn buckle intermediate the ends of said further connecting rod; as and for the purpose specified.

4. A brake device for elevators comprising bearings; shafts mounted in said bearings; cranks at the extremities of said shafts; shoes mounted on said cranks; centre-cranks produced in said shafts interjacent the extremities thereof; connecting rods connecting certain of said centre cranks; a lever arrangement; further connecting rods connecting certain of said centre-cranks with said lever arrangement as and for the purpose specified.

5. A brake device for elevators comprising bearings; shafts mounted in said bearings; cranks at the extremities of said shafts; shoes mounted on said cranks; centre-cranks produced in said shafts interjacent the extremities thereof; connecting rods connecting certain of said centre cranks; a turn buckle intermediate the ends of each of said connecting rods; for adjusting the same; as and for the purpose specified.

6. A brake device for elevators comprising bearings; shafts mounted in said bearings; cranks at the extremities of said shafts; shoes mounted on said cranks; centre-cranks produced in said shafts interjacent the extremities thereof; connecting rods connecting certain of said centre-cranks; a turn buckle intermediate the ends of each of said connecting rods, for adjusting the same; actuating means; further connecting rods connecting certain of said centre-cranks with said actuating means; and a turn buckle intermediate the ends of each of said further connecting rods; as and for the purpose specified.

7. A brake device for elevators comprising rotatable shafts; cranks at the extremities of said shafts; shoes mounted on said cranks; centre-cranks produced in said shafts interjacent the extremities thereof; a connecting rod connecting said centre-cranks, actuating means and means connecting said actuating means with one of said centre-cranks.

In testimony whereof I affix my signature.

FRED H. MILKS.